United States Patent
Dubinskii et al.

(10) Patent No.: US 10,942,719 B2
(45) Date of Patent: Mar. 9, 2021

(54) SYSTEM AND METHOD FOR CONNECTOR DEVELOPMENT AND INTEGRATION CHANNEL DEVELOPMENT

(71) Applicant: Ingram Micro, Inc., Irvine, CA (US)

(72) Inventors: Viacheslav Dubinskii, Moscow (RU);
Artem Ermakov, Moscow (RU);
Timur Khakimyanov, Lobnya (RU);
Anton Logvinenko, Moscow (RU);
Igor Vagulin, Dolgoprudny (RU)

(73) Assignee: INGRAM MICRO INC., Irvine, CA (US)

( * ) Notice: Subject to any disclaimer, the term of this patent is extended or adjusted under 35 U.S.C. 154(b) by 0 days.

(21) Appl. No.: 15/980,487

(22) Filed: May 15, 2018

(65) Prior Publication Data
US 2019/0354354 A1    Nov. 21, 2019

(51) Int. Cl.
*G06F 9/44* (2018.01)
*G06F 8/60* (2018.01)
*G06F 8/36* (2018.01)
*G06F 8/61* (2018.01)
*G06F 8/71* (2018.01)
*G06F 11/36* (2006.01)
*G06F 8/41* (2018.01)

(52) U.S. Cl.
CPC ............ *G06F 8/60* (2013.01); *G06F 8/36* (2013.01); *G06F 8/41* (2013.01); *G06F 8/61* (2013.01); *G06F 8/71* (2013.01); *G06F 11/3688* (2013.01)

(58) Field of Classification Search
CPC ..... G06F 8/60; G06F 8/36; G06F 8/41; G06F 8/61; G06F 8/71; G06F 11/3688
USPC .................................................. 717/100–108
See application file for complete search history.

(56) References Cited

U.S. PATENT DOCUMENTS 9,824,390 B2 * 11/2017 Adapalli ................ H04L 67/10
10,089,083 B2 * 10/2018 Khambay ............... G06F 9/541

OTHER PUBLICATIONS

PCT/US2019/03247, International Search Report, International Searching Authority, dated Jun. 21, 2019.
PCT/US2019/03247, Written Opinion of the International Searching Authority, International Searching Authority, dated Jun. 21, 2019.

* cited by examiner

*Primary Examiner* — Chuck O Kendall
(74) *Attorney, Agent, or Firm* — Ice Miller LLP

(57) ABSTRACT

Independent Software Vendors ISVs develop, support, execute, and sell cloud applications. Cloud Service Broker Platforms (CSBs) provide partially-automated delivery of integrated cloud applications from different ISVs. Integration of ISV software requires special integration components such as connector packages and connector backends. Development of such components can be time consuming and expensive. The present disclosure relates to a system and method for allowing connector developers to decrease the cost of developing connector package and connector backends by allowing deployment and configuration of web services automatically and also allows support for scalability and zero-downtime upgrades out of the box, by the use of an automated authoring tool that generates connector packages from archetypes created by the CSB.

10 Claims, 7 Drawing Sheets

SYSTEM AND METHOD FOR CONNECTOR DEVELOPMENT AND INTEGRATION CHANNEL DEVELOPMENT

TECHNICAL FIELD

This disclosure relates to a system and method of development, and more particularly, to a system and method for connector development and integration channel deployment.

BACKGROUND

Currently, many independent software vendors (ISVs) offer their software via online service platforms. Such software as a service (SaaS) vendors, allow SaaS subscribers/end users to obtain and use software services that are hosted by the SaaS provider. ISVs develop, support, execute, and sell cloud SaaS offerings. For example, Dropbox® and Office365® are common examples of SaaS offerings by ISVs.

In some embodiments, ISVs offer their software via cloud service broker (CSB) platforms. CSBs provide partially-automated delivery of integrated cloud applications from different ISVs to resellers and end-customers. A CSB platform allows customers to acquire and configure integrated cloud applications from different ISVs in one place, through unified user interfaces (UI).

In order to enable such integration to the CSB, ISVs usually prepare special integration components, referred to as connector packages and connector backends. A connector backend is used for transforming application programming interface (API) calls with control methods received from the CSB platform to API calls specific to the respective ISV cloud application(s). In some embodiments, such integration components are presented as web-services which are responsible for handling requests from a CSB.

In one embodiment, connector packages usually take the form of an archive file that includes metadata, control method descriptions, and content files, which are used to declare and define the SaaS application resources, services, user interface components, and logic of control methods necessary for managing resources.

Development of connector and connector backends may be a complicated process consisting of several components and activities including, for example: designing ISV's application resources and defining CSB meta description terms; implementing business logic to handle CSB requests for resource creation, change, deletion, linking, unlinking, and custom operations; creating automated back end unit and integration tests; creating UI application screens and embedding them into CSB predefined placeholders; packaging ISV's connector package; deploying and configuring connector backend and making it accessible from CSB for validation; checking all scenarios for selling, upselling, cancelation, and termination; and the like.

Moreover, upon adding any new integration components, the ISVs will have to maintain connector backend to support the ability to sell current SaaS offerings and ability for customers to manage their SaaS purchases online. ISVs desire to avoid any connector backend service downtime so as to ensure maximum availability for sales.

The current development of connector and connector backends is time consuming, expensive, and susceptible to down-time. Therefore, there is a need for an improved system and method for connector development and integration channel deployment that allows connector developers (e.g. ISVs) to decrease the cost of developing connector packages and connector backends, and allows for deployment and configuration of web services that support SaaS integration, automatically, and further allows scalability and zero-downtime upgrades.

SUMMARY

The present disclosure relates to a method for connector development of software services, using a cloud service broker (CSB) platform, the method includes receiving a request for creation of a connector package, the developer tool operably connected to the CSB platform; creating a copy of an archetype connector package to create a base connector package; compiling business logic code for the software services, and generating the connector package based at least in part on the base connector package; creating a resource model schema, the resource model schema further packaged into a connector archive; creating a connector backend deployment unit, the connector backend deployment unit further combined into a server image; creating a container orchestrator package, the container orchestrator package comprising a set of container orchestrator resources, the container orchestrator package then pushed into a packages repository; pushing the server image to a server repository; assembling the server image, the resource model schema from the connector archive, and container orchestrator package to create an archive connector package; and delivering the archive connector package to the CSB platform.

In at least one embodiment of the present disclosure, creating a base connector package further includes requesting an application name and a persistence condition; downloading additional components selected from a group consisting of libraries, drivers, and log appenders; generating connector package sources; and creating a development directory.

In at least one embodiment of the present disclosure the archive connector package further includes an assembly of user interface code, resource model, navigation descriptions, and deployment descriptors.

In at least one embodiment of the present disclosure, the method for integration channel development of software services, using a cloud service broker (CSB) platform includes, installing an archive connector package to the CSB platform via the CSB platform application programming interface (API); receiving a container orchestrator package; generating authentication credentials, the authentication credentials further built into a deployment descriptor; running a connector backend obtained from the container orchestrator package; generating a backend endpoint uniform resource locator (URL); and registering the endpoint URL at the CSB platform.

In at least one embodiment of the present disclosure, a system for connector development and integration channel development of software services, using a cloud service broker (CSB) platform is provided, the system includes a developer tool operably connected to the CSB platform, the developer tool further comprising an infrastructure component library; and a plurality of developer tool modules; the CSB platform further comprising a CSB controller.

In at least one embodiment of the present disclosure, the system further includes a plurality of libraries selected from a group consisting of a log manager, tests, monitoring manager, authorization manager, user interface components, database manager, REST application service, and developer component placeholder.

In at least one embodiment of the present disclosure, the developer tool modules is selected from a group consisting of a component creator, an archiver, a compiler, a resource model schema builder, an integration channel builder, a component builder, an interface, a connector assembler, an image builder, and a container orchestrator package builder.

In at least one embodiment of the present disclosure, the system further the developer tool, is configured to request creation of a connector package; create a copy of an archetype connector package to create a base connector package; compile business logic code for the software services, and generate the connector package based at least in part on the base connector package; create a resource model schema, the resource model schema further packaged into a connector archive; create a connector backend deployment unit, the connector backend deployment unit further combined into a server image; create a container orchestrator package, the container orchestrator package comprising a set of container orchestrator resources, the container orchestrator package then pushed into a packages repository; push the server image to a server repository; assemble the resource model schema from the connector archive, and container orchestrator package to create an archive connector package; and deliver the archive connector package to the CSB platform.

DETAILED DESCRIPTION

Reference will now be made in detail to the preferred embodiments of the present disclosure, examples of which are illustrated in the accompanying drawings. Additional features and advantages of the disclosure will be set forth in the description that follows, and will be apparent from the description, or may be learned by practice of the disclosure. It is to be understood that both the foregoing general description and the following detailed description are exemplary and explanatory and are intended to provide further explanation of the disclosure as claimed.

Figure 1:
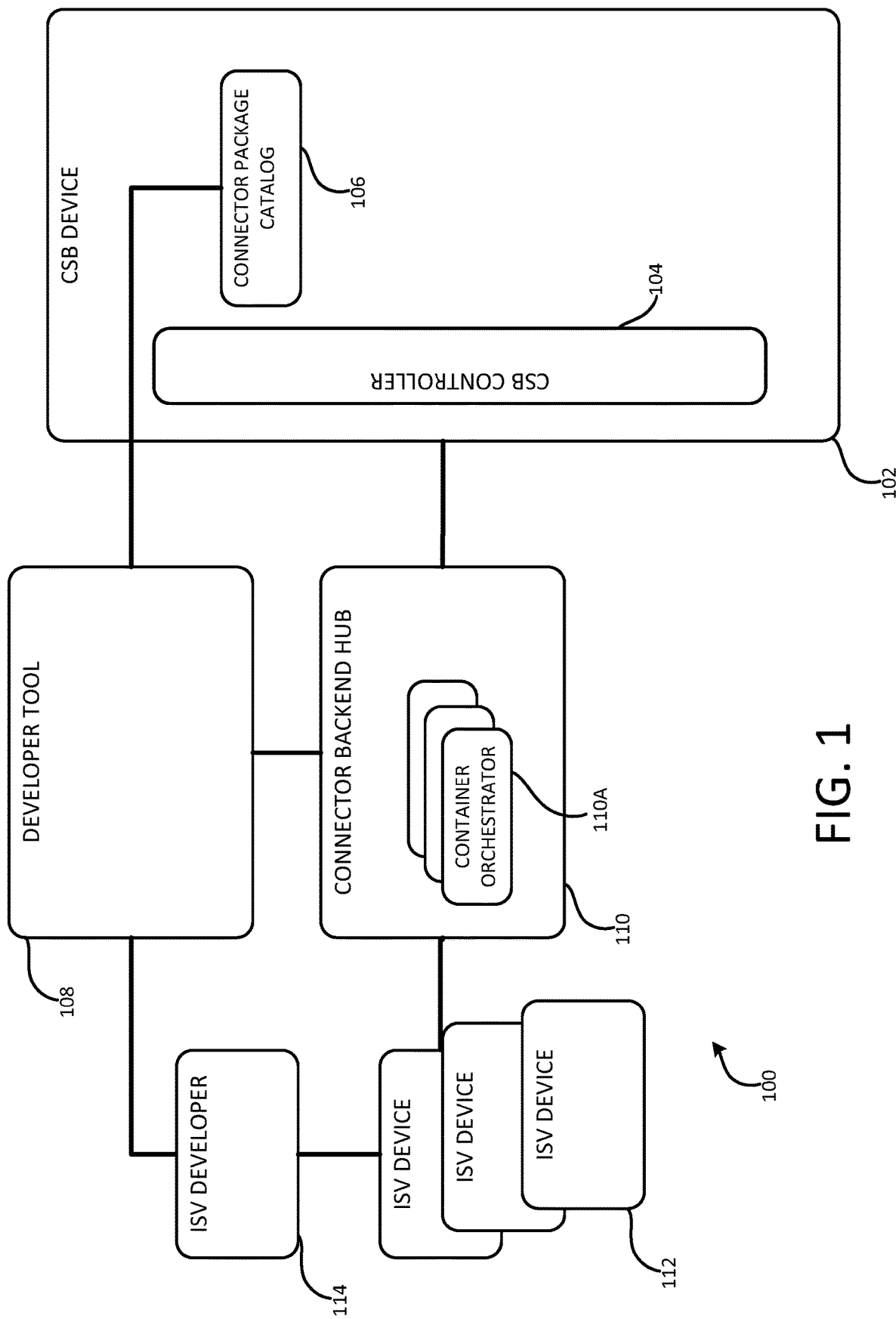
FIG. 1 displays a schematic drawing of a system connector development and integration channel deployment, according to at least one embodiment of the present disclosure.

Referring now to FIG. 1, it is shown a system 100 for connector development and integration channel deployment, according to at least one embodiment of the present disclosure. The system 100 includes a cloud service broker (CSB) device 102, a CSB controller 104, a connector package catalog 106, a developer tool 108, a connector backend hub 110, an independent software vendor (ISV) device 112, and an ISV developer device 114.

In at least one embodiment of the present disclosure, the CSB device 102 includes a CSB controller 104 and a connector package catalog 106. Although the CSB controller 104 and connector package catalog 106 are shown as components within the CSB device 102, it is well within the scope of this disclosure that the CSB controller 104 and connector package catalog 106 may be separate, and remotely located and operably connected to the CSB device 102. In at least one embodiment of the present disclosure, the CSB controller 104 is configured to create resources adapted to a package that is obtained from the connector package catalog 106. By way of an example, a developer tool (as further disclosed herein) may be configured to upload a package to the connector package catalog 106, whereby the CSB controller 104 uses the information obtained from the package catalog to provision resources applicable to the package (i.e. the software).

In at least one embodiment of the present disclosure, the connector backend hub 110 includes at least one container orchestrator solution 110A, such as Kubernetes, Docker swarm, and the like. It will be appreciated that the connector backend hub 110 may include as many container orchestrator solution 110. As well known to one having ordinary skill in the art, and as further disclosed herein. In at least one embodiment of the present disclosure, the container orchestrator solution 110A is configured to allow for automated deployment, scaling, and operations of application containers across clusters of host. By way of an example, a particular software service may be desired to be deployed across multiple servers (i.e. hosts) to support an expected usage load (beyond the capacity of a single server/host). Continuing with this example then, the container orchestrator solution 110A is configured to allow for the deployment of such a software via application containers across clusters of hosts/servers. In at least one embodiment of the present disclosure, the container orchestrator solution 110A is operably connected to the CSB device 102, and the ISV device 112, via an API, by way of one non-limiting example. It will be appreciated that the container orchestrator solution 110A may be configured as an infrastructure-as-a-service (IaaS) solution. In at least one embodiment of the present disclosure, the container orchestrator solution 110A is configured to hold a plurality of APIs accessible by the CSB device 102, wherein the CSB device 102 may use such APIs to configure connector backends. It will be further appreciated that the system 100 may include a plurality of container orchestrator solutions, the each of the plurality of container orchestrator solutions configured for different purposes, for example, for testing, or production support purposes.

In at least one embodiment of the present disclosure, the system 100 may include a plurality of ISV devices 112. It is well within the scope of this disclosure that the system 100 may include as many ISV devices 112 as there are ISVs that will be providing SaaS offerings via the CSB platform (i.e. the CSB device 102).

Figure 2:
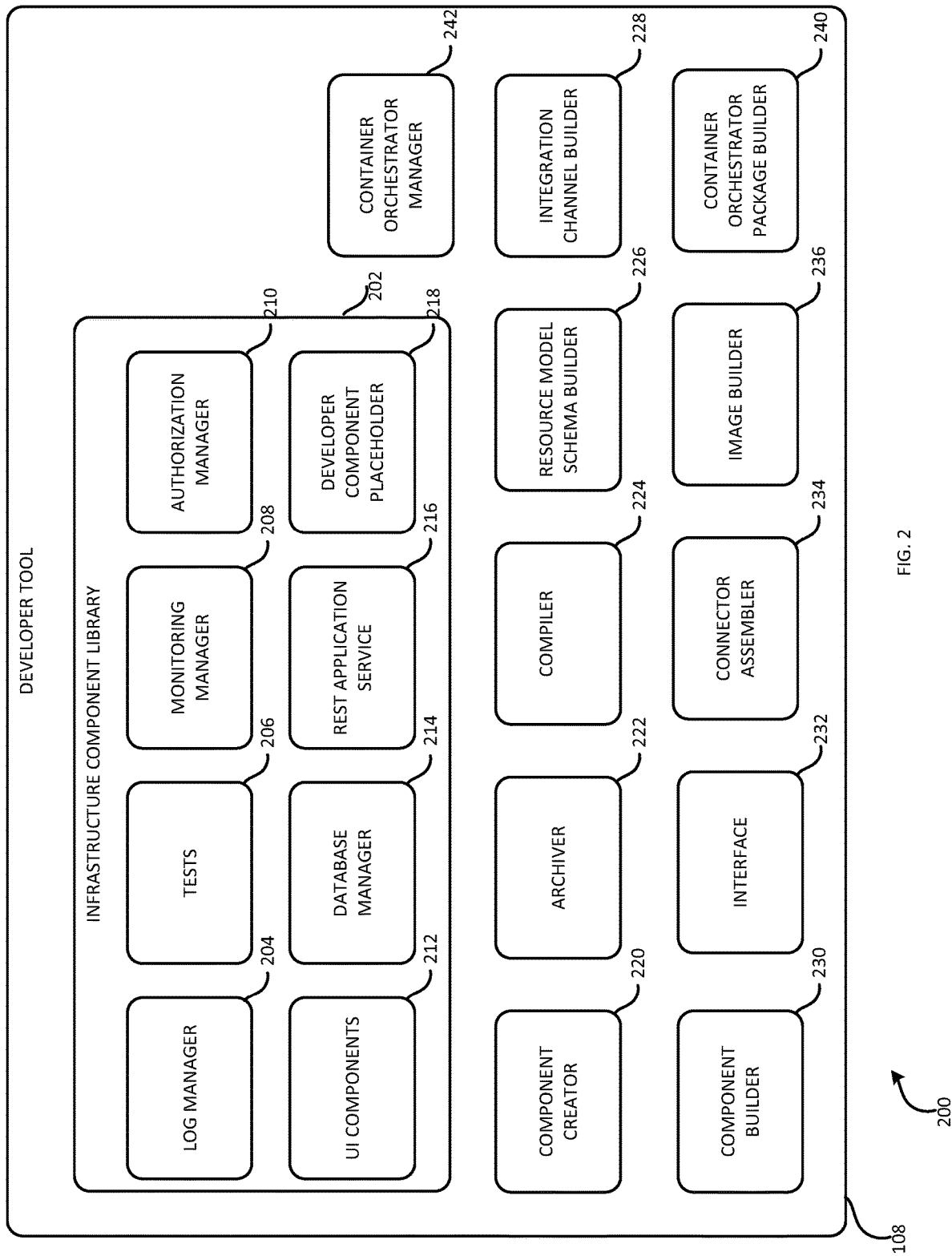
FIG. 2 displays a schematic drawing of a developer tool, according to at least one embodiment of the present disclosure.

Referring now to FIG. 2, there is shown the components of a developer tool 108, generally indicated at 200, according to at least one embodiment of the present disclosure. In at least one embodiment of the present disclosure, the developer tool 108 includes an infrastructure component library 202, a component creator 220, an archiver 222, a complier 224, a resource model schema builder 226, an integration channel builder 228, a component builder 230, an interface 232, a connector assembler 234, an image builder 236, a container orchestrator package builder 240, and a container orchestrator manager 242.

In at least one embodiment of the present disclosure, the resource model schema builder 226 is configured to convert specially annotated Java files to connector package resource schema. The resource model schema builder 226 is configured to reads special annotations, such as, for example, APSType, APSStructure, and the like, and transforms the annotated fields to fields in resource schema. It will be appreciated that the resource model schema builder 226 contains a list of available operations with resource in CSB device 102 and used data types in JSON format.

In at least one embodiment of the present disclosure, the component builder 230 is configured to dynamically download Java libraries from a plurality of repositories such as, for example, a Maven Central Repository, and stores the same in local cache. The component builder 230 is further configured to store in local cache, any built artifacts, such as, for example, web archives, Zip® archives, and the like. It will be appreciated that the component builder 230 is configured to download artifacts from the plurality of repositories, if it cannot be found in local cache.

In at least one embodiment of the present disclosure, the interface 232 is configured to create developer specified required properties via command line in interactive or non-interactive mode.

In at least one embodiment of the present disclosure, the image builder 236 is configured to create Docker® images based on built deployment unit (step 412), as further disclosed herein. It will be appreciated that a Docker® image is an inert, immutable, file that is essentially a snapshot of a container. It will be further appreciated that a container is an instance of a Docker® image, and a runtime object.

In at least one embodiment of the present disclosure, the infrastructure component library 202 further includes a plurality of pre-defined connector package libraries, including: a log manager library 204, tests library 206, monitoring manager library 208, authorization manager library 210, user interface (UI) components library 212, database manager library 214, REST application service library 216, and development component placeholder library 218.

In at least one embodiment of the present disclosure, the log manager library 204 includes logging libraries for integration with a connector backend that uses unified logging mechanisms. It will be appreciated that unified logging reduces maintenance costs. In at least one embodiment of the present disclosure, the log manager 204 includes a logging subsystem configured to log all standard output of connector backend (provided that the connector backend is configured to log), as would be well known to one having ordinary skill in the art. It will be appreciated that the log manager 204 may be configured to log all incoming HTTP and outgoing API requests that are logged at a trace level applicable to such logging.

In at least one embodiment of the present disclosure, the developer tool 202 is operable to configure the embedded logger, which includes: setting up unique names which may be equal to connector package name that is used for origin determination in centralized logging system; generating logs for all incoming and outgoing request for trace needs; extracting correlation and generation information from incoming requests for multi-services calls; setting up unified log line formats which includes date, correlation identifiers, thread identifier, unique name, logger name and log message; and setting up asynchronous standardized output logging appender. It will be appreciated that the unified log file format allows for favorable performance. It will be further appreciated that asynchronous standardized output logging allows for easier searching in a centralized logging system.

In at least one embodiment of the present disclosure, the tests library 206 is configured to build, and run various tests, such as, for example, unit test, and integration tests, as would be well known to one having ordinary skill in the art.

In at least one embodiment of the present disclosure, the monitoring manager library 208 includes libraries for health and performance metrics monitoring, such as, for example, hypertext transfer protocol (HTTP) requests, structured query language (SQL) requests, average response time, maximum response time, minimum response time, active sessions, number of parallel requests, and the like. It will be appreciated that the monitoring manager 208 is further configured to track metrics collected via Java Management Extensions (JMX), which resources are represented by objects called Managed Beans (MBeans) as would be well known to one having ordinary skill in the art. It will be appreciated that the monitoring manager library 208 includes APIs and classes that can be dynamically loaded and instantiated, which give an ability for external (running outside the cluster) monitoring system, such as, for example, Zabbix.

In at least one embodiment of the present disclosure, the authorization manager library 210 is configured to provide authorization protocol libraries, including, but not limited to, OAuth 1.0 protocols, and the like. It will be appreciated that OAuth credentials (KEY and SECRET) are provided to connector backend hub 110 via environment variables, as is well known to one having ordinary skill in the art.

In at least one embodiment of the present disclosure, the UI components library 212 is configured to provide embedded UI components configured to create connector packages that can operably connect to a CSB platform (e.g. CSB device 102). It will be appreciated that a Java developer framework may be used for creating connector specific UI components.

In at least one embodiment of the present disclosure, the database manager library 214 is configured to provide components for establishing connection with databases, including any third-party databases. For example, a connector package developer may prefer to use its own database for storing data instead of a database provided by the CSB platform. In at least one embodiment of the present disclosure, the database manager library may be a component of the connector backend hub 110. It will be appreciated that the database manager library 214 can provide connection to databases based on credentials, and to provide the connector backend 110 with environment variables.

In at least one embodiment of the present disclosure, the REST application service library 216 is configured to provide REST service components which is configured to operate with requests for software instance, creation, updates, deletion, and the like.

In at least one embodiment of the present disclosure, the developer component placeholder library 218 is configured to provide a placeholder library for connector developer's business code, as further disclosed herein.

In at least one embodiment of the present disclosure, the developer tool 108 is configured to operate in 'development' mode. The developer tool 108 is configured to generate new connector packages from an archetype created by a CSB platform developer (not shown). In at least one embodiment of the present disclosure, a new connector package name is specified and whether the database is needed is selected (as further disclosed herein). The archetype is defined as an original pattern or model from which all other copies of the same kind are made, and follows the archetype pattern of development, that is well known to one having ordinary skill in the art, and further disclosed herein.

In at least one embodiment of the present disclosure, the connector package is in the form of an archive file that typically includes metadata, control method descriptions, and content files, which are used to declare and define the (SaaS) application resources, services, user interface components, and logic of control methods necessary for managing resources. It will be appreciated that a connector package consists of the declarative files used to define the ISV's application resources and of the "connector frontend" (i.e. the web-interface that CSB customers see in the CSB interface (on the client side)). It will be further appreciated that the web-interface is developed by connector package developers using a special framework, which may include widgets, predefined page structure, navigation methods and screen insertion mechanisms, and the like. In at least one embodiment of the present disclosure, a connector frontend consists of screens inserted into predefined views, custom logic for rendering widgets and custom navigation structure. By way of an example, the widgets may display information that the connector developer considers to be valuable for the customer of the corresponding SaaS offering (e.g. usage reporting, subscription and service information, instructions, etc.).

In at least one embodiment of the present disclosure, the connector backend is a web service configured to interpret CSB REST API requests and transform them into ISV's service API requests to create services, tenants, assign services to users, and link services between each other. It will be appreciated that the CSB REST API offers wide integration and functionality options and allows for implementation of most scenarios applicable to cloud services like selling, upselling, canceling, and the like. In at least one embodiment of the present disclosure, all CSB operations are defined in terms of creation, update and deletion of application service resources and creation links between them. It will be appreciated that some actions can be implemented as custom operation on some resource where standardized actions are not well suited. It will be further appreciated that connector backend packages can be developed by ISV's software developers using various programming languages well known to one having ordinary skill in the art, or can be provided by any service models (e.g. SaaS, Function as a service (FaaS)), or can be deployed within platform-as-a-service (PaaS) or infrastructure-as-a-service (IaaS) models.

Figure 3:
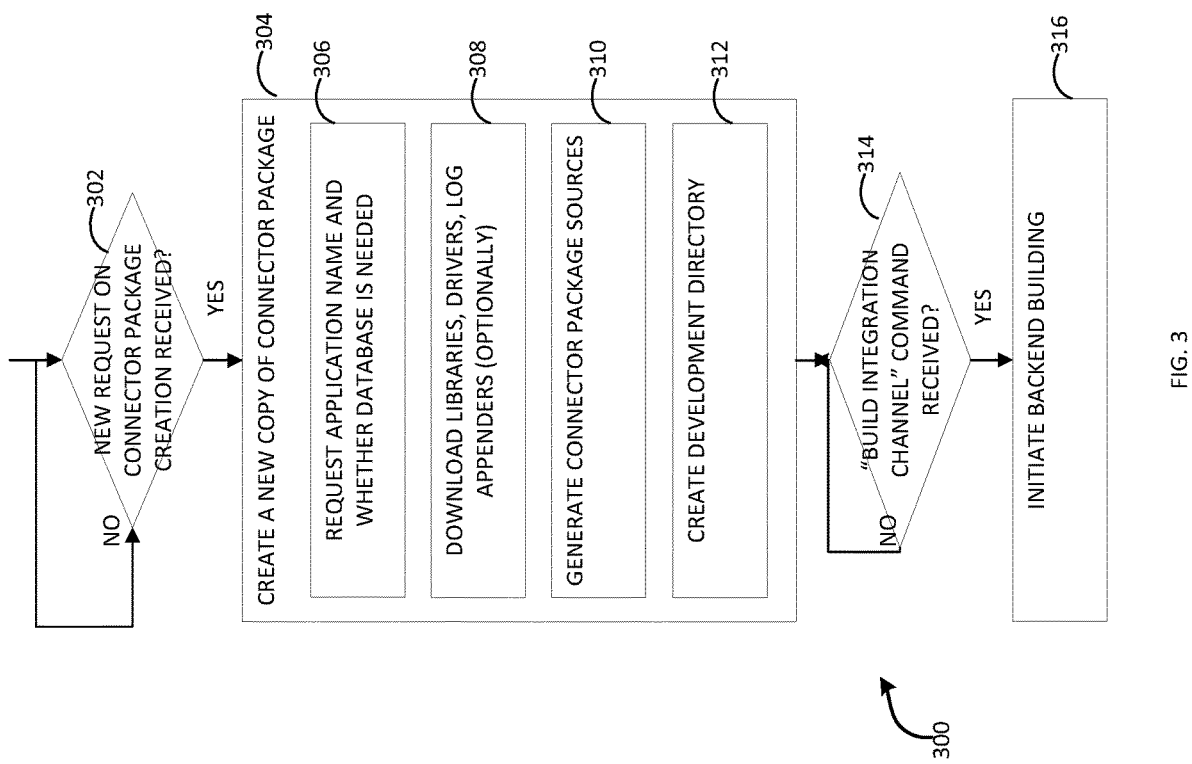
FIG. 3 displays a flowchart of a method for connector development and integration channel deployment, according to at least one embodiment of the present disclosure.

Referring now to FIG. 3, there is shown a method 300 for connector development and integration channel development, according to at least one embodiment of the present disclosure. The method 300 includes checking for a request at step 302, creating a connector package copy at step 304, checking for an integration command at step 314, and initiating backend building at step 316.

In at least one embodiment of the present disclosure, the step 304 further includes requesting an application name and whether a database is needed, at step 306. In at least one embodiment of the present disclosure, the interface 232 is configured to receive a request for an application name, and information on whether a database is needed.

In at least one embodiment of the present disclosure, the step 304 further includes downloading libraries at step 308. In at least one embodiment of the present disclosure, the component builder 230 is configured to download libraries, drivers, log appenders, and the like, from a plurality of repositories, such as, for example, a Maven central repository, and stores such items in the local cache.

In at least one embodiment of the present disclosure, the step 304 further includes generating connector package sources at step 310. In at least one embodiment of the present disclosure, the component creator 220 is configured to create new connector package in file system, and component builder 230 is configured to build new connector package from the file source generated by component creator 220.

In at least one embodiment of the present disclosure, the method 300 proceeds to step 314 to check if a build integration channel signal is received. If a signal has not been received, the method 300 waits. Otherwise, the method 300 proceeds to step 316.

Figure 4:
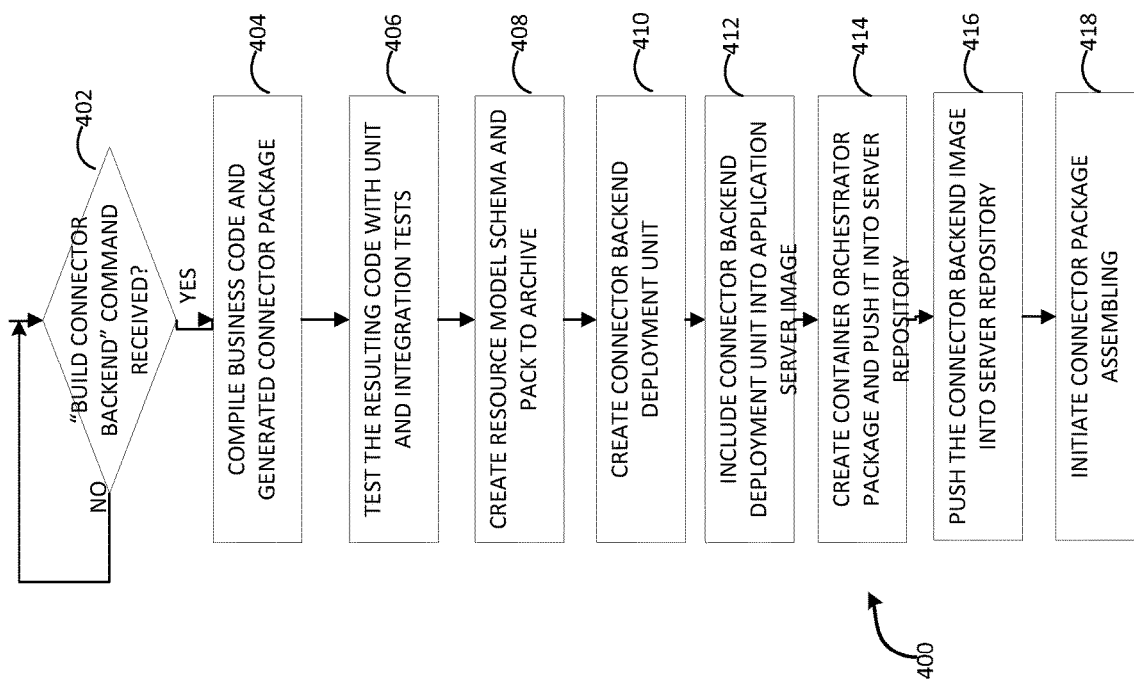
FIG. 4 displays a flowchart of a method for connector development and integration channel deployment, according to at least one embodiment of the present disclosure.

In at least one embodiment of the present disclosure, the step 316 includes initiating a backend building process (as further disclosed herein via FIG. 4).

Referring now to FIG. 4, there is shown a method for building a connector backend, generally indicated at 400, according to at least one embodiment of the present disclosure. The method 400 begins at step 402 where a check is performed to see if a build connector backend command is received. If the command is not received, the method 400 waits; otherwise, the method 400 proceeds to step 404.

In at least one embodiment of the present disclosure, business code is compiled and connector packages are generated at step 404. In at least one embodiment of the present disclosure, after a connector developer completes backend building, the developer tool 102 is configured to automatically compile new connector package source code (including any business code), and test the new connector package.

The method 400 then proceeds to step 406 where testing occurs of the code produced in step 404. It will be appreciated that testing can include unit and integration tests. In at least one embodiment of the present disclosure, the compiler 224 is configured to perform the activities of step 404 and 406. In at least one embodiment of the present disclosure, the compiler 224 creates byte-code from source files (e.g. Java source files).

In at least one embodiment of the present disclosure, the developer tool 102 is further configured to use the resource model schema builder 226 to generate resource model schema(s) and pack the same into archives, at step 408. It will be appreciated that resource model schema(s) are generated from Java classes of business code written by the connector developer.

In at least one embodiment of the present disclosure, a connector backend deployment unit is created at step 410. In at least one embodiment of the present disclosure, the archiver 222 is configured to create the connector backend deployment unit, and further configured to create an archive (e.g. Zip® file) from source and compiled files of the connector package.

Figure 7:
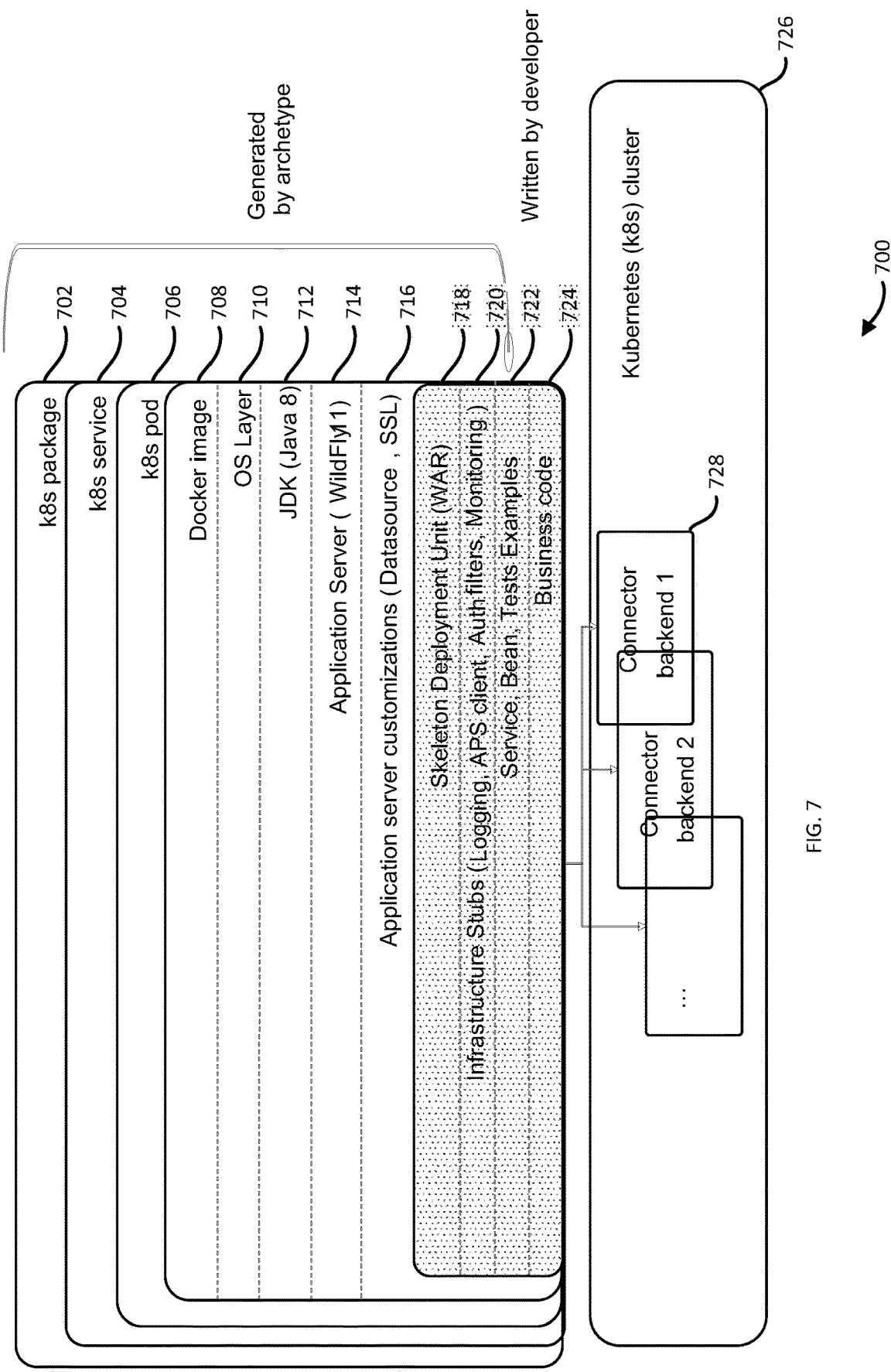
FIG. 7 displays components of a system for connector development and integration channel deployment, according to at least one embodiment of the present disclosure.

In at least one embodiment of the present disclosure, the connector backend deployment unit is included into an application service image, at step 412, via the image builder 236. In at least one embodiment of the present disclosure, the image (e.g. a Docker image) for new connector backend is built by the predefined rules in the archetype. The image is built up from a series of layers, wherein each layer represents a simple instruction. For example, referring to FIG. 7, there is shown an exemplary embodiment of layer in an archetype, according to at least one embodiment of the present disclosure. Each layer except the very last one (e.g. layer 702-722) is read-only. Each layer is only a set of differences from the layer before it. The layers are stacked on top of each other. It will be appreciated that the base image (i.e. layers 702-722 are based on the archetype) is provided by CSB platform developer (and not by connector developer).

In at least one embodiment of the present disclosure, a container orchestrator package is created at step 414, via the container orchestrator package builder 240. It will be appreciated that a plurality of third-party software mechanisms can be used to create a container orchestrator package (e.g. Helm chart for Kubernetes), which package describes a related set of container orchestrator resources and push it into a packages repository (e.g. GitHub repository). In at least one embodiment of the present disclosure, the package is created as files laid out in a particular directory tree, and packed into versioned archives to be deployed.

In at least one embodiment of the present disclosure, the connector backend image is pushed into a server repository (e.g. CSB device 102's developers' repository), at step 416, via the image builder 236. In at least one embodiment of the present disclosure, the image created in step 414 pushed to the CSB images repository (Docker Registry). It will be appreciated that the Registry is a stateful, highly scalable server-side application that stores and lets to distribute Docker images;

The method 400 terminates at step 418 where the connector package is assembled into an archive (e.g. Zip®).

Figure 5:
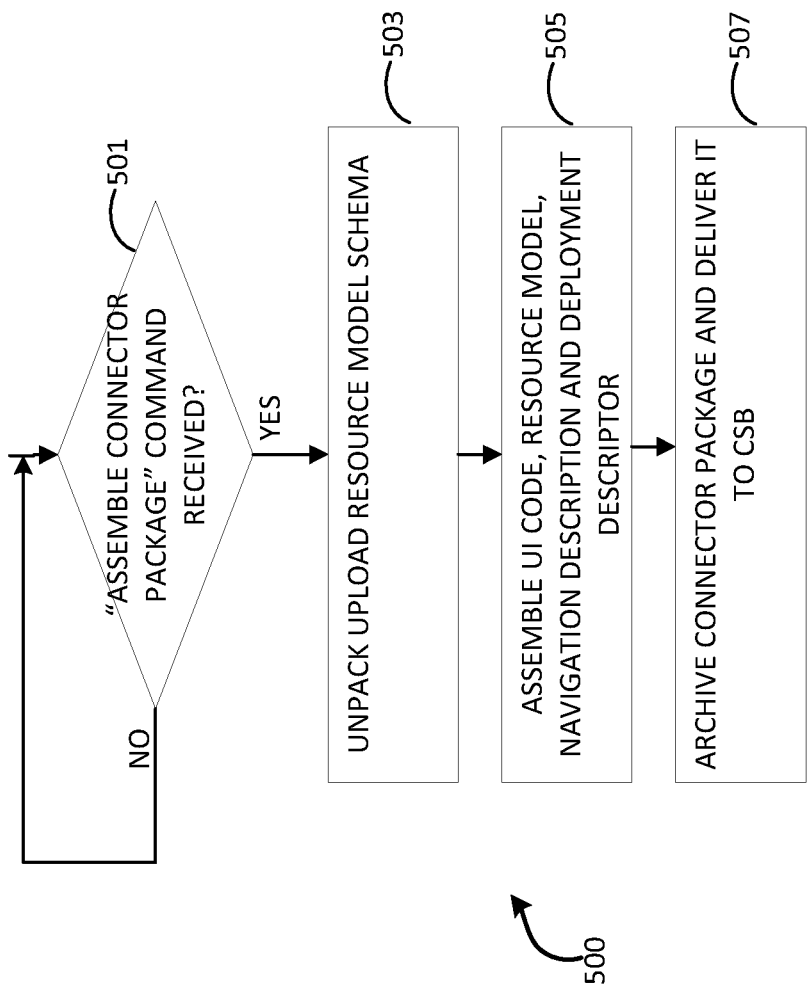
FIG. 5 displays a flowchart of a method for connector development and integration channel deployment, according to at least one embodiment of the present disclosure.

Referring now to FIG. 5, there is shown a method 500 for assembling connector packages, according to at least one embodiment of the present disclosure. In at least one embodiment of the present disclosure, the developer tool device 108 is configured to check if a command is received to assemble connector packages, at step 501. If the command has not been received, the method 500 waits; otherwise, the method 500 proceeds to step 503.

In at least one embodiment of the present disclosure, the resource model schema is unpacked at step 503, via the connector assembler 234.

In at least one embodiment of the present disclosure, the UI code is assembled at step 505, using the connector assembler 234. In at least one embodiment of the present disclosure, the resource model schema, navigation description and container orchestrator packages are further assembled. It will be appreciated that the container orchestrator package contains information required for its deployment to container orchestrator, including, but not limited to image name, version, required components with its versions, environment variables, ports mapping, and the like.

In at least one embodiment of the present disclosure, the connector package is archived using the archiver 222, and delivered to the connector package catalog 106, at step 507.

Figure 6:
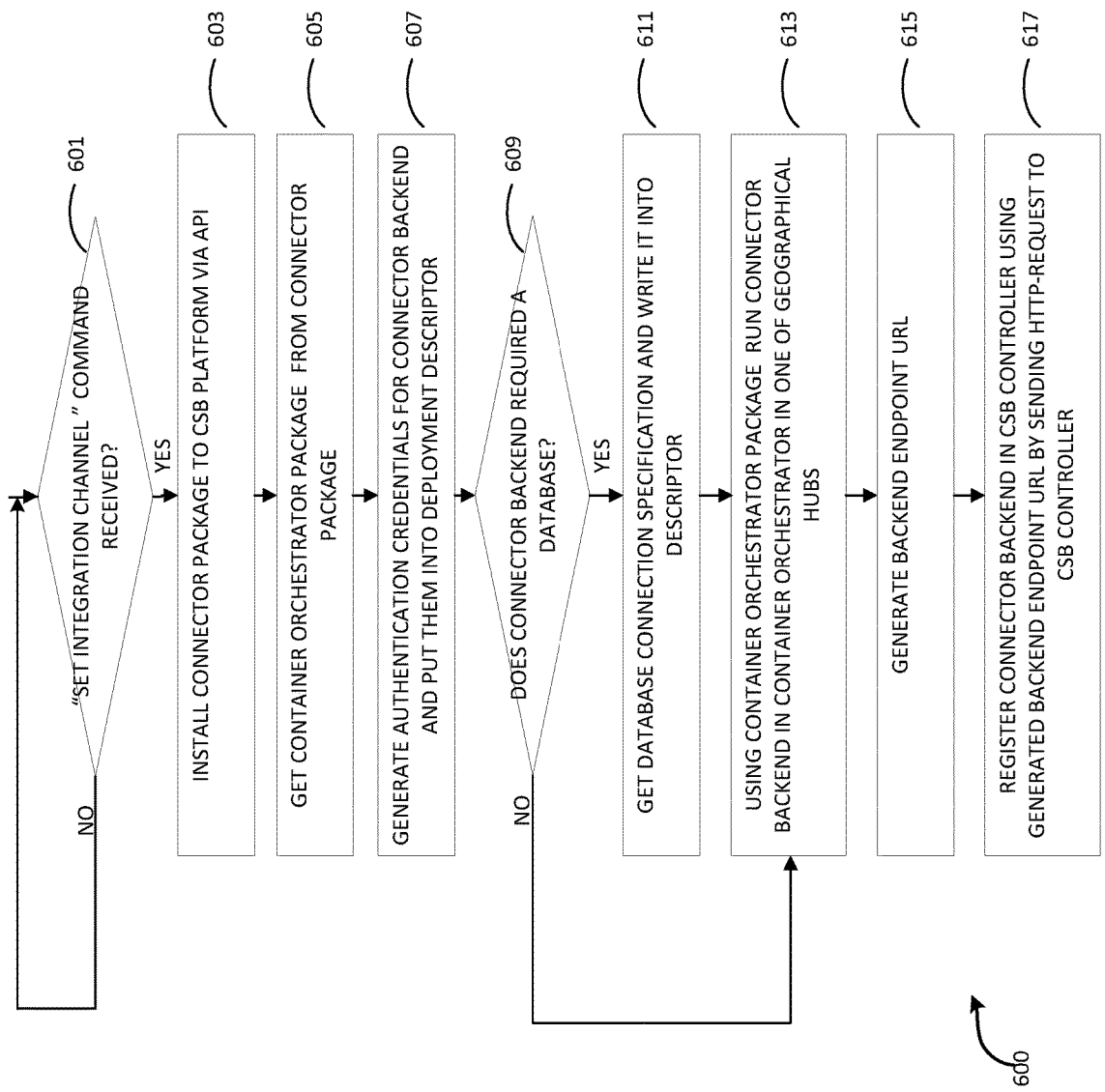
FIG. 6 displays a flowchart of a method for connector development and integration channel deployment, according to at least one embodiment of the present disclosure.

Referring now to FIG. 6, where is shown a method 600 for building a channel, according to at least one embodiment of the present disclosure. In at least one embodiment of the present disclosure, the integration channel builder 228 is configured to perform the steps of method 600, as further disclosed herein.

In at least one embodiment of the present disclosure, the method 600 is configured to perform a check at step 601 to see if a command is received (e.g. via the interface 232) to set the integration channel. If no command is received, the method waits; otherwise, the method proceeds to step 603.

In at least one embodiment of the present disclosure, the developer tool 108 is configured to install the connector package to the CSB device 102, via a CSB provided API, at step 603.

In at least one embodiment of the present disclosure, the developer tool 108 is configured to receive the container orchestrator package from connector package, at step 605.

In at least one embodiment of the present disclosure, the developer tool 108 is configured to generate authorization credentials, at step 607. In at least one embodiment of the present disclosure, the developer tool 108 is further configured to override pre-existing environment authentication data based on information received from the container orchestrator package.

The method 600 then proceeds to step 609 where a check is performed to see if the connector package requires persistence (i.e. the use of a database to ensure statefulness). If the connector backend requires a database, the method 600 proceeds to step 609; otherwise, it proceeds to step 613.

In at least one embodiment of the present disclosure, if the connector package requires a database, the developer tool 108 is configured to require the developer to specify a database connection string and override environment based on container orchestrator package, at step 611. In at least one embodiment of the present disclosure, the developer tool 108 may receive this information at step 611.

In at least one embodiment of the present disclosure, the developer tool 108 is configured to run a connector backend in one of the connector backend hubs, at step 613. The developer tool 108 is further configured to include container orchestrator (e.g. a Kubernetes) via container orchestrator manager 242. In at least one embodiment of the present disclosure, the container orchestrator manager 242 is configured to run connector backends, configures load balancing, add scalability, and keeps logs.

The method 600 then proceeds to step 615 where the container orchestrator generates a backend endpoint URL. In at least one embodiment of the present disclosure, the container orchestrator (e.g. Kubernetes) downloads connector backend image with required dependencies, and runs them in a predefined order set in the container orchestrator package and returns endpoint URL of deployed connector backend.

The method 600 then proceeds to step 617, where the developer tool 108 registers the connector backend in the CSB controller 104 using provided endpoint URL by sending appropriate hypertext transfer protocol (HTTP) request to CSB controller 104.

In at least one embodiment of the present disclosure, the developer tool 108 is further configured to operate in upgrade mode, wherein the developer tool 108 installs a new version of connector package to the CSB platform via the CSB API, and the developer tool 108 receives new container orchestrator package from connector package. Finally, the developer tool 108 is configured to upload new container orchestrator package to container orchestrator (e.g. Kubernetes). In at least one embodiment of the present disclosure, the container orchestrator downloads new container application service image with new dependencies, runs the new image and then stops the previous version from operation. It will be appreciated that the container orchestrator allows for real-time (i.e. hot) upgrades without service downtime.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for connector development of software services, using a cloud service broker (CSB) platform, the method comprising:

receiving at a developer tool, a request for creation of a connector package, the developer tool operably connected to the CSB platform;

creating a copy at the developer tool, of an archetype connector package to create a base connector package;

compiling, at the developer tool, business logic code for the software services, and generating the connector package based at least in part on the base connector package;

creating, at the developer tool, a resource model schema, the resource model schema further packaged into a connector archive;

creating, at the developer tool, a connector backend deployment unit, the connector backend deployment unit further combined into a server image;

creating, at the developer tool, a container orchestrator package, the container orchestrator package comprising a set of container orchestrator resources, the container orchestrator package then pushed into a packages repository;

pushing, at the developer tool, the server image to a server repository;

assembling, at the developer tool, the server image, the resource model schema from the connector archive, and container orchestrator package to create an archive connector package; and delivering the archive connector package to the CSB platform.

2. The method of claim 1, wherein creating a base connector package further comprises:

requesting an application name and a persistence condition;

downloading additional components selected from a group consisting of libraries, drivers, and log appenders;

generating connector package sources; and creating a development directory.

3. The method of claim 1, further including the step of testing the connector package.

4. The method of claim 1, wherein the archive connector package further includes an assembly of user interface code, resource model, navigation descriptions, and deployment descriptors.

5. The method of claim 1, wherein the server image comprises a plurality of instruction set layers.

6. The method of claim 5, wherein the plurality of instruction set layers forms a base image.

7. The method of claim 5, wherein a last layer of the plurality of instruction set layers includes a developer layer.

8. A method for integration channel development of software services, using a cloud service broker (CSB) platform, the method comprising:

installing an archive connector package to the CSB platform via the CSB platform application programming interface (API);

receiving at the CSB platform, a container orchestrator package;

generating, at a developer tool, authentication credentials, the authentication credentials further built into a deployment descriptor;

running, via a container orchestrator, a connector backend obtained from the container orchestrator package;

generating, at the developer tool, a backend endpoint uniform resource locator (URL);

and registering the endpoint URL at the CSB platform.

9. The method of claim 8 further comprising a check for a persistence requirement.

10. The method of claim 9 wherein a database connection is specified and the database connection is further written into the deployment descriptor.

* * * * *